United States Patent
Bastide et al.

(10) Patent No.: US 9,602,460 B2
(45) Date of Patent: Mar. 21, 2017

(54) SOCIAL MAIL RESPONSE ENHANCEMENT

(71) Applicant: International Business Machines Corporation, Armonk, NY (US)

(72) Inventors: Paul R. Bastide, Boxford, MA (US); Matthew E. Broomhall, Goffstown, NH (US); Robert E. Loredo, North Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 254 days.

(21) Appl. No.: 13/948,209

(22) Filed: Jul. 23, 2013

(65) Prior Publication Data

US 2015/0032825 A1    Jan. 29, 2015

(51) Int. Cl.
*H04L 12/58* (2006.01)

(52) U.S. Cl.
CPC .............. *H04L 51/34* (2013.01); *H04L 51/32* (2013.01)

(58) Field of Classification Search
CPC .. G06Q 10/101; G06Q 10/103; G06Q 10/107; G06Q 10/063114; G06Q 10/06316; H04L 67/1095
See application file for complete search history.

(56) References Cited

U.S. PATENT DOCUMENTS

| | | | |
|---|---|---|---|
| 7,194,681 B1 * | 3/2007 | Horvitz ................ | G06Q 10/107 707/999.007 |
| 7,584,251 B2 | 9/2009 | Brown et al. | |
| 7,966,373 B1 | 6/2011 | Smith et al. | |
| 7,974,849 B1 | 7/2011 | Begole et al. | |
| 2002/0087646 A1 | 7/2002 | Hickey et al. | |
| 2005/0265101 A1 * | 12/2005 | Nambu .................. | G06Q 10/10 365/222 |
| 2006/0041626 A1 | 2/2006 | Chen et al. | |
| 2006/0149819 A1 * | 7/2006 | Auhagen .............. | G06Q 10/107 709/206 |
| 2006/0248573 A1 | 11/2006 | Pannu et al. | |
| 2007/0174394 A1 * | 7/2007 | Jayaweera ........... | G06Q 10/107 709/206 |
| 2009/0198785 A1 * | 8/2009 | Uchiyama .............. | G06Q 10/00 709/206 |
| 2009/0313554 A1 | 12/2009 | Haynes et al. | |
| 2010/0185496 A1 * | 7/2010 | Hahn ................ | G06F 17/30528 705/7.33 |
| 2010/0250643 A1 * | 9/2010 | Savage ................ | G06Q 10/107 709/202 |

OTHER PUBLICATIONS http://www.google.com/analytics/apps/results?category=Email%20Marketing, Google Analytics, Application Gallery, "Email Marketing", Accessed Jul. 16, 2013.

* cited by examiner

*Primary Examiner* — Vivek Srivastava
*Assistant Examiner* — Nasim Nirjhar
(74) *Attorney, Agent, or Firm* — Michael A. Petrocelli

(57) ABSTRACT

A method and system for managing electronic messaging which includes monitoring an electronic message generated by a plurality of users. The electronic message including content. A criteria is determined for setting a status of the electronic message, and the criteria includes a change of the content of the electronic message. A change of the content of the electronic message is detected based on the criteria. The status of the electronic message is set, and the status is indicated to the plurality of users of the electronic message.

20 Claims, 2 Drawing Sheets

SOCIAL MAIL RESPONSE ENHANCEMENT

BACKGROUND

Field

The present disclosure relates to a method and system for managing electronic messaging, and more particularly, managing electronic messages by detecting a change in the message and notifying a user.

Background of the Disclosure

Communicative exchanges by multiple users using one or more communications networks or communications systems can include extensive conversations, for example, via email or text messaging. Users can communicate via electronic messaging which may be accessible by a computer or personal data assistant (PDA). Further, users can communicate using, on-line chat groups, blogs, e-mails, instant messaging, document libraries, and social networking websites accessible using the Internet. Messaging applications may include, Instant Messaging, using a cell phone or through a service via the Internet using a computer. Email is also extensively used via the Internet or using an Intranet. An extensive email communication may be created, or likewise an extensive messaging thread, between users replying and adding to an initiator of the message. The use of multiple clients or devices, for example, mobile phones, tablets, laptops, netbooks, car communication systems, etc., are also available.

Known email and messaging systems may include techniques to detect and indicate a status or a change of an electronic message, such as indicating: replied, updating, or read. Also, techniques exist to send a return receipt to a sender. However, one shortcoming of present systems for detecting and indicating status of electronic communication is regarding detecting and indicating a change in the content of the message.

For example, multiple users may email or text message each other creating a thread or a communications thread over time. The participants in the thread may not be aware of another user's message. For example, one participant may be answering a question by an initiator of the thread, while another user is preparing and sending another answer to the same question. Thus, efforts are duplicated and undesirable confusion can occur.

A problem with known techniques of indicating status or a change of an electronic message is determining if a subset of addressed users have answered or responded to a social mail message. For example, there is not a straightforward and uncomplicated way to determine if one or more users included in an email thread have answered or replied to an originating email. A user may have to expand all emails in a thread and ascertain the sender and/or read each email in a thread to determine if another user has responded to the originating email. This technique may be problematic, time consuming, cumbersome for the user, and prone to error.

SUMMARY

Therefore in light of the shortcoming of the art discussed above, there is a need for a method and system to provide a technique for detecting, and indicating to a participant of an electronic communication, for example an electronic message or communications thread, that a change has occurred in the communication, including a reply by a participant.

According to an aspect of the invention, a method for managing electronic messaging includes the steps of, monitoring an electronic message generated by a plurality of users, wherein the electronic message includes content. A criteria is determined for setting a status of the electronic message, and the criteria includes a change of the content of the electronic message. The method includes detecting the change of the content of the electronic message based on the criteria, and setting the status of the electronic message. The status is indicated to the plurality of users of the electronic message, and at least one of the above steps is performed using a program executable by a processor of a computer.

In another aspect according to the invention a computer program product for managing electronic messaging in a communications network comprises a computer readable storage medium having program code embodied therewith. The program code is readable/executable by a processor to perform a method, including: monitoring an electronic message generated by a plurality of users, the electronic message including content; determining a criteria for setting a status of the electronic message, the criteria including a change of the content of the electronic message; detecting the change of the content of the electronic message based on the criteria; setting the status of the electronic message; and indicating the status to the plurality of user of the electronic message.

In another aspect according to the invention, a system for managing electronic messaging in a communications network includes an electronic message using a communications network. The electronic message is generated by a plurality of users, and the electronic message includes content. A computer system is configured to monitor the electronic message. The computer system includes a program executable by a processor of the computer system, and the computer system is configured to determine criteria for setting a status of the electronic message. The criteria includes a change of the content of the electronic message. The computer system is configured to detect the change of the content of the electronic message based on the criteria, and the computer system is configured to set the status of the electronic message, and indicate the status to the plurality of user of the electronic message.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
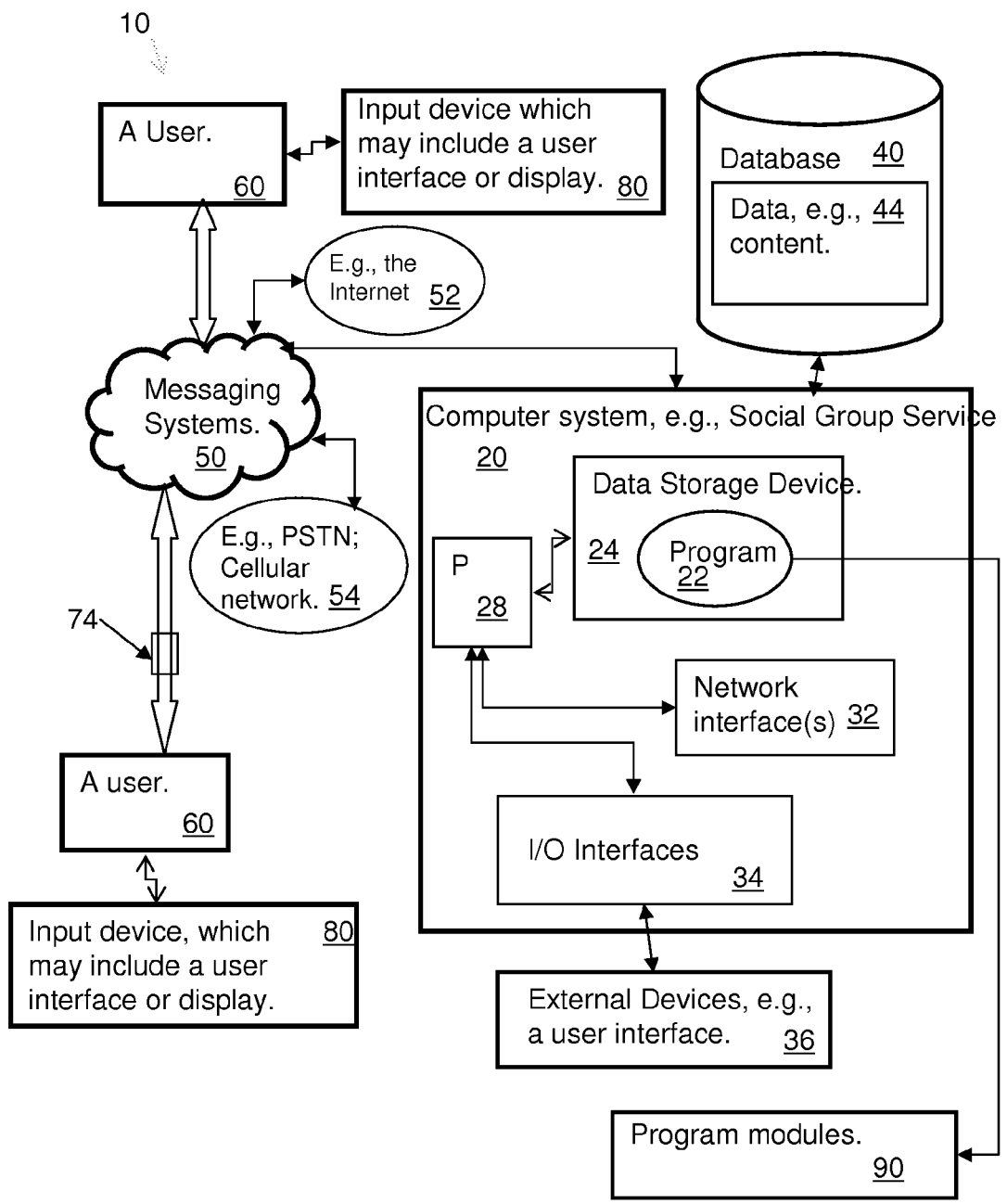
FIG. 1 is a schematic block diagram illustrating an overview of a system and methodology for managing electronic messaging according to an embodiment of the disclosure.
Figure 2:
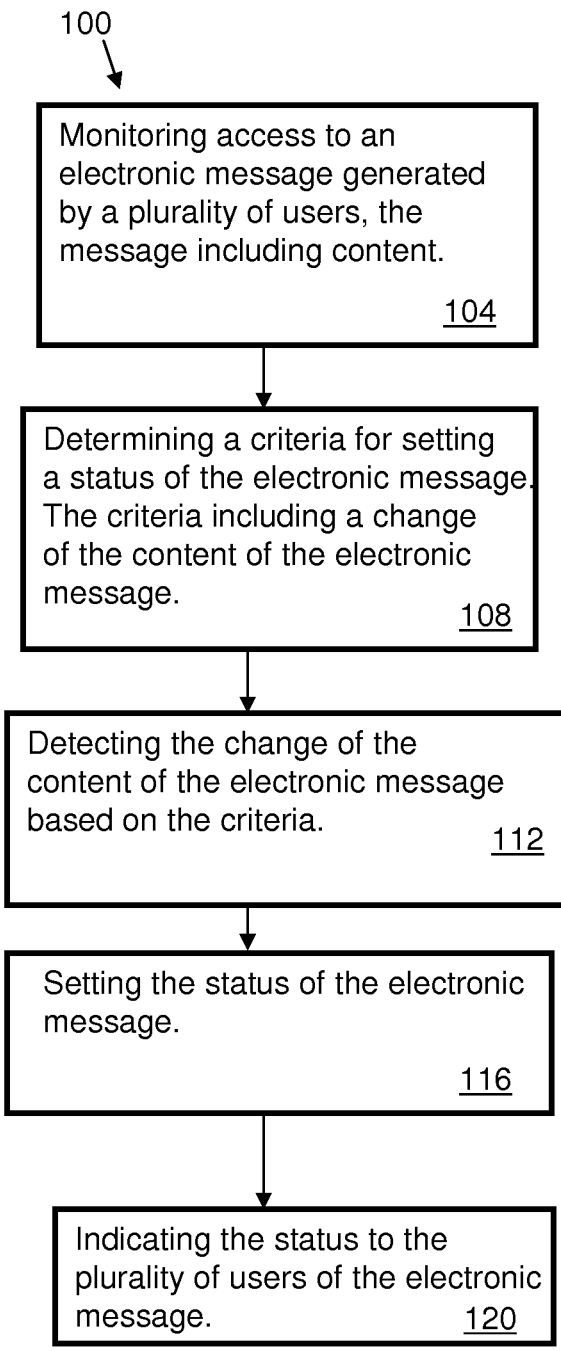
FIG. 2 is a flow chart illustrating a method for managing electronic messaging using the system of FIG. 1 according to an embodiment of the disclosure.

Referring to FIGS. 1 and 2, a system 10 and a method 100 for managing electronic messaging on a communications system according to an embodiment of the invention is described below. Step 104 of method 100 includes monitoring an electronic message (also referred to as a message thread, or a thread) generated by a plurality of users, wherein the electronic message includes content. The electronic message can include multiple users' contributions/communications to an initial message which generates the content of an extended message, e.g., a message thread. The plurality of users are generically represented by users 60, shown in FIG. 1. Each of the users 60 have access to a communications device embodied as an input device 80. The input device is a generic representation of one or more devices which can send an electronic message such as a text or email. The electronic message is generically represented at message 74 in FIG. 1. The communication devices may include an input device, that is, a computer, or Personal Data Assistant (PDA), cell phone, notebook, or the like. The content of the electronic message may include, for example, text, a photo, or an attachment.

The users 60 may send a message 74, for instance using a PDA, which uses a communications system, e.g., messaging system 50 which can include the Internet 52, or a public switched telephone network (PSTN) for example, a cellular network 54. The PSTN may include telephone lines, fiber optic cables, microwave transmission links, cellular networks, and communications satellites. Exemplary messaging services may include Short Message Service (SMS) which is a text messaging service component of phone, web, or mobile communication systems, using standardized communications protocols which allows the exchange of short text messages between fixed line or mobile phone devices. The Internet may facilitate numerous texting techniques, for example, using a cell phone or laptop computer to send text messages via Multimedia Messaging Service (MMS) (related to SMS) as one way to send messages that include multimedia content to and from mobile phones, or to and from one or more email accounts via the Internet.

The message 74 sent by the users 60 can include data 44 which may be stored in a database 40 of a computer system 20. The computer system can be part of a social group service for providing the method disclosed herein as a service. The method 100 may be embodied in a program 22 embodied on a computer readable storage device, e.g., data storage device 24, and is executable by a processor 28 of the computer 20 (i.e., execute program steps, code, or program code). The program or executable instructions therefrom, may be offered as a service by a provider. The program may also be stored and run locally on a user device. The computer 20 and program 22 shown in FIG. 1 are generic representations of a computer and program that may be local to a user, or provided as a remote service, such as a website accessible using the Internet. The computer 20 also generically represent herein a computer device such a personal data assistant, a laptop, or desktop computer, etc., or part of one or more servers, alone or as part of a datacenter. The computer system 20 can include a network interface 32, and input/output (I/O) interface(s) 34. The I/O interface 34 allows for input and output of data with an external device 36 that may be connected to the computing device. The network interface 32 may provide communications between the computing device and a computer network.

The program 22 may include program modules 90 for executing specific steps, routines, sub-routines, instructions or code, of the program. Such modules 90 are generically represented in FIG. 1.

The input devices may utilize modes of communication or communication threads, which may include emails, messaging (e.g., electronic messaging) which can include data, text, or electronic content. Example devices for input devices may include any device capable of electronically communicating between devices, for example: a laptop, a notebook, a cell phone, a netbook, a tablet, a personal data assistant (PDA), or a car communication system. The input devices are collectively represented as input devices 80 shown in FIG. 1.

Step 108 of the method 100 includes determining a criteria for setting a status of the electronic message, the criteria including a change of the content of the electronic message. The content of the electronic message may include includes text, or an attachment, or a photo. Changing the content can include, for example, adding text for a reply to a received message, or adding an attachment.

Step 112 includes detecting the change of the content of the electronic message based on the criteria. As discussed above, the criteria includes a change of the content. The method 100 detects the change in content, such as a user's reply to a sender's email, or an attachment.

Step 116 includes setting the status of the electronic message. The status may include, opened, unopened, content change, content unchanged, or attachment added, and the status includes indicating to the users in the message thread that a content change has occurred. Step 120 includes indicating the status to the plurality of user of the electronic message. The status indication may include a field in an email, or dialog box in an email, which indicates, by text or other notification, that a change has occurred. The status indication may be stored in a field which is automatically added to the social mail message. The status can be indicated by a color, flag, sound, font change or other such indication that a change of status of the electronic message has occurred. The change of status notifies the users that a change to the electronic message has occurred. The status can further include an indication of an action taken by a user, such as: added an attachment, replied to main thread, created a sub-thread, or no action taken.

The status may also identify that an electronic message is received, opened, read, updated, being updated, responded to, the receiver and the user of the message. The status may also indicate importance of the message using various indications, such as, a sound, symbol, a color, a font, or specific words. Each user can have a status, which is indicated in the electronic message, such as in a field of the message as discussed above, and other users are thereby notified of the status for each user. The field can be updated to indicate the current state of other users which may include whether a user has interacted in, for example, an email thread. Thereby, one advantage of the present disclosure is the method 100 and system 10 indicates whether a subset of the addressed users have answered or responded to an electronic message. Another advantage of the present disclosure is that a user can quickly identify social mail messages which require attention from the notification of the status indication.

In one example of the present disclosure, the method can check the header elements for a state of a mail message. Upon a user completing a social mail message or action on a social mail message, the method can send an update to the other users. The method can share a snapshot or a visualization of the workflow which a user completed. The method may share a number of metrics with users, such as, who initiated the message, or a number of replies or activations. The status indication may include, a mark, or highlight to an interface element which can show the users who interacted with a social mail message. The method may push or pull updates at triggered or set intervals, or updates can be implemented asynchronously or synchronously. The method may integrate with analytics solutions to predict a user's need to respond to a message. For example, metrics and algorithms may be used to calculate needs for additional responses from a user, based on, for example, a user's availability, or time invested in a social message.

In another example, utilizing analytics, which may include metrics and algorithms, predictions of requirements related to a message may include: response time, availability, actions, importance, security exposures. An action, such as, a notification by the method, or a security action, may be initiated based on the predictions.

While embodiments of the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

Therefore, one or more Figures described herein may illustrate a schematic of an embodiment of the disclosure and may include a representative computer system or processing system that may implement a method and a program in one or more embodiments of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with one or more processing systems in the present disclosure may include, but are not limited to, personal computer systems, server computer systems, handheld or laptop devices, multiprocessor systems, microprocessor-based systems, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units, a system memory, and a bus that couples various system components including system memory to processor. Computer system may include a variety of computer system readable media. Such media may be any available media that is accessible by computer system, and it may include both volatile and non-volatile media, removable and non-removable media. System memory 58, shown in FIG. 1, can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices such as a keyboard, a pointing device, a display, etc.; one or more devices that enable a user to interact with computer system; and/or any devices (e.g., network card, modem, etc.) that enable computer system to communicate with one or more other computing devices. Such communication can occur via Input/Output (I/O) interfaces. Additionally, computer systems can communicate with one or more networks such as a local area network (LAN), a general wide area network (WAN), and/or a public network (e.g., the Internet) via network adapter. As depicted, network adapter communicates with the other components of computer system via bus. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

Additionally, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Further, any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams as may be illustrated in the one or more Figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments, features, and instructive examples described above are illustrative, and should not be construed to limit the present disclosure to the particular embodiments or enumerated examples. Thus, various changes and modifications may be effected by one skilled in the art without departing from the spirit or scope of the disclosure as defined in the appended claims.

What is claimed is:

1. A computer-implemented method for managing electronic messaging, comprising:
    monitoring, using a computer, an electronic message generated by a plurality of users using a communications system for sending the electronic message between the plurality of users generating a message thread within the electronic message which includes content from the plurality of users;
    determining a criteria for setting a status of the electronic message, the criteria including a change of the content of the electronic message, the change of content including an action by a user, the action including a reply to the message thread, and the change of content including: additional content, or adding an attachment to the electronic message, or creation of a sub-thread, or no action taken;
    detecting the change of the content of the electronic message based on the criteria;
    setting the status of the electronic message for each of the plurality of users;
    indicating the status of each of the plurality of users to the plurality of users of the electronic message, wherein the status includes an indicator which indicates the action by the user and the change of content;
    analyzing, utilizing analytics and metrics, user information to predict requirements, the requirements being related to the electronic message, the requirements being selected from a group comprising: response time, availability, actions, importance, and security exposure;
    calculating, using the analysis and metrics, a need for an additional action from the user, based on one or more of: an availability of the user, and an amount of time the user invested in the electronic message, the additional action consisting of an additional reply to the message thread from the user; and
    generating and sending a notification to the user based on the predicted requirements and the need for the additional action;
    in response to the user receiving the notification, the user initiating the additional reply to the message thread.

2. The method of claim 1, wherein the status includes: received, opened, read, updating, updated, responded to, or important.

3. The method of claim 1, wherein the status is stored in a field automatically added to the electronic message.

4. The method of claim 1, wherein the status is indicated on a user interface.

5. The method of claim 1, wherein the status is indicated by a visual message in the electronic message.

6. The method of claim 1, wherein the status is indicated in the electronic message, the indication of the status including: text, a color, a font, a sound, or a flag.

7. The method of claim 1, further comprising:
    initiating the additional action.

8. The method of claim 1, wherein the content includes text, or an attachment.

9. A computer program product for managing electronic messaging in a communications network, the computer program product comprising a "non-transitory" computer readable storage medium having program code embodied therewith, the program code being readable/executable by a processor to perform a method, comprising:
    monitoring an electronic message generated by a plurality of users using a communications system for sending the electronic message between the plurality of users generating a message thread within the electronic message which includes content from the plurality of users;
    determining a criteria for setting a status of the electronic message, the criteria including a change of the content of the electronic message, the change of content including an action by a user, the action including a reply to the message thread, and the change of content including additional content or adding an attachment to the electronic message, or creation of a sub-thread, or no action taken;
    detecting the change of the content of the electronic message based on the criteria;
    setting the status of the electronic message for each of the plurality of users;
    indicating the status of each of the plurality of users to the plurality of users of the electronic message, wherein the status includes an indicator which indicates the action by the user and the change of content;
    analyzing, utilizing analytics and metrics, user information to predict requirements, the requirements being related to the electronic message, the requirements being selected from a group comprising: response time, availability, actions, importance, and security exposure;
    calculating, using the analysis and metrics, a need for an additional action from the user, based on one or more of: an availability of the user, and an amount of time the user invested in the electronic message, the additional action consisting of an additional reply to the message thread from the user; and
    generating and sending a notification to the user based on the predicted requirements and the need for the additional action;
    in response to the user receiving the notification, the user initiating the additional reply to the message thread.

10. The computer program product of claim 9, wherein the status includes: received, opened, read, updating, updated, responded to, or important.

11. The computer program product of claim 9, wherein the status is stored in a field automatically added to the electronic message.

12. The computer program product of claim 9, wherein the status is indicated on a user interface.

13. The computer program product of claim 9, wherein the status is indicated by a visual message in the electronic message.

14. The computer program product of claim 9, wherein the status is indicated in the electronic message, the indication of the status including: text, a color, a font, a sound, or a flag.

15. The computer program product of claim 9, further comprising:
initiating the additional action.

16. The computer program product of claim 9, wherein the content includes text, or an attachment.

17. A system for managing electronic messaging in a communications network, comprising:
an electronic message using a communications network, the electronic message generated by a plurality of users, the electronic message including content;
a computer system including one or more computer processors, one or more computer-readable storage media, and program instructions stored on one or more of the computer-readable storage media for execution by at least one of the one or more processors, the program instructions, comprising:
monitoring the electronic message for sending the electronic message between the plurality of users generating a message thread within the electronic message including the content from the plurality of users;
determining a criteria for setting a status of the electronic message, the criteria including a change of the content of the electronic message, the change of content including an action by a user, the action including a reply to the message thread, and the change of content including additional content or adding an attachment to the electronic message, or creation of a sub-thread, or no action taken;
detecting the change of the content of the electronic message based on the criteria;
setting the status of the electronic message for each of the plurality of users;
indicating the status of each of the plurality of users to the plurality of users of the electronic message, wherein the status includes an indicator which indicates the action by the user and the change of content;
analyzing, utilizing analytics and metrics, user information to predict requirements, the requirements being related to the electronic message, the requirements being selected from a group comprising: response time, availability, actions, importance, and security exposure;
calculating, using the analysis and metrics, a need for an additional action from the user, based on one or more of: an availability of the user, and an amount of time the user invested in the electronic message, the additional action consisting of an additional reply to the message thread from the user; and
generating and sending a notification to the user based on the predicted requirements and the need for the additional action;
in response to the user receiving the notification, the user initiating the additional reply to the message thread.

18. The system of claim 17, wherein the status is stored in a field automatically added to the electronic message.

19. The system of claim 17, wherein the status is indicated on a user interface.

20. The system of claim 17, wherein the computer system is configured to initiate the additional action.

\* \* \* \* \*